(12) United States Patent
Fujioka et al.

(10) Patent No.: US 8,463,764 B2
(45) Date of Patent: Jun. 11, 2013

(54) SOCIAL BASED SEARCH ENGINE, SYSTEM AND METHOD

(75) Inventors: Robb Fujioka, Manhattan Beach, CA (US); Daryl Okimoto, Cerritos, CA (US)

(73) Assignee: Fuhu Holdings, Inc., El Segundo, CA (US)

(*) Notice: Subject to any disclaimer, the term of this patent is extended or adjusted under 35 U.S.C. 154(b) by 91 days.

(21) Appl. No.: 12/381,905

(22) Filed: Mar. 17, 2009

(65) Prior Publication Data
US 2009/0287682 A1    Nov. 19, 2009

Related U.S. Application Data

(60) Provisional application No. 61/069,775, filed on Mar. 17, 2008.

(51) Int. Cl.
*G06F 17/30* (2006.01)
(52) U.S. Cl.
USPC .................................. 707/706; 707/999.005
(58) Field of Classification Search
None
See application file for complete search history.

(56) References Cited

U.S. PATENT DOCUMENTS

| | | | |
|---|---|---|---|
| 5,903,896 A * | 5/1999 | Waldman et al. | 1/1 |
| 2002/0049738 A1* | 4/2002 | Epstein | 707/1 |
| 2002/0052913 A1* | 5/2002 | Yamada et al. | 709/202 |
| 2003/0084066 A1* | 5/2003 | Waterman et al. | 707/104.1 |
| 2005/0038686 A1 | 2/2005 | Lauffer | |
| 2006/0184378 A1 | 8/2006 | Agarwal et al. | |
| 2006/0218111 A1 | 9/2006 | Cohen | |
| 2007/0113181 A1* | 5/2007 | Blattner et al. | 715/706 |
| 2007/0218900 A1 | 9/2007 | Abhyanker | |
| 2009/0144639 A1* | 6/2009 | Nims et al. | 715/757 |
| 2009/0150387 A1* | 6/2009 | Marchewitz | 707/5 |

* cited by examiner

*Primary Examiner* — Anteneh Girma
(74) *Attorney, Agent, or Firm* — Marc E. Hankin; Kevin Schraven; Hankin Patent Law, APC

(57) ABSTRACT

A social based search apparatus, system and method. The apparatus, system and method may include receiving, from a user, at least one search keyword, comparing the search keyword to a plurality of keywords having one or more experts associated therewith, and producing a first search result including at least one expert and information associated with the at least one expert, wherein the at least one expert and the information are at least substantially related to the at least one search keyword. The present invention may additionally include applying at least one filter to the first search result, wherein the at least one filter includes a broadening of the at least one search keyword.

13 Claims, 17 Drawing Sheets

SOCIAL BASED SEARCH ENGINE, SYSTEM AND METHOD

PRIORITY INFORMATION

This application claims the benefit of U.S. Provisional Application Ser. No. 61/069,775, entitled "Social Based Search Engine, System And Method", filed Mar. 17, 2008, the disclosure of which is incorporated by reference herein as if set forth in its entirety.

FIELD OF THE INVENTION

The present invention relates generally to search engines and, more particularly, to a social based search engine, system and method that may use expert resources to enhance search results.

BACKGROUND OF THE INVENTION

At present, typical keyword searches entered into a search engine cause the performance of a web crawl, wherein the best matches to the keywords searched that are located by the web crawl are returned as the search results. However, the matches returned via this methodology often poorly matches what the user intended to locate via the user's search. The poor matches are frequently reflective of the fact that different search terms can mean different things to different people—that is, people having different demographic or personal characteristics may have similar views of what would constitute relevant results to a user search. Available search engines fail to take advantage of this similarity of certain users in order to enable improvement in search results.

Additionally, although the prior art may make available the re-use of a prior search by a searching user, such re-use of a search is not likely useful, unless the prior searcher had a greater expertise in the area searched than did the present searcher. Thus, existing search engines fail to recognize and make use of the expertise of others in endeavoring to return the best search results for a searching user.

Therefore, the need exists for a search engine, system and method that returns search results based on those results deemed most useful by experts in the field searched, and that allows for results to be filtered based on those experts most similar to the searching user in demographic and personal information.

SUMMARY OF THE INVENTION

The present invention includes a social based search apparatus, system and method. The apparatus, system and method may include receiving, from a user, at least one search keyword, comparing the search keyword to a plurality of keywords having one or more experts associated therewith, and producing a first search result including at least one expert and information associated with the at least one expert, wherein the at least one expert and the information are at least substantially related to the at least one search keyword. The present invention may additionally include applying at least one filter to the first search result, wherein the at least one filter includes a broadening of the at least one search keyword.

Thus, the present invention provides a search engine, system and method that returns search results based on those results deemed most useful by experts in the field searched, and that allows for results to be filtered based on those experts most similar to the searching user in demographic and personal information.

BRIEF DESCRIPTION OF THE FIGURES

Understanding of the present invention will be facilitated by consideration of the following detailed description of the embodiments of the present invention taken in conjunction with the accompanying drawings, in which like numerals refer to like parts and in which:

FIG. 12 is an exemplary search result providing filtering options, according to an aspect of the present invention;

FIG. 14 is another exemplary search result providing filtering options, according to an aspect of the present invention;

DETAILED DESCRIPTION OF THE PREFERRED EMBODIMENTS

It is to be understood that the figures and descriptions of the present invention have been simplified to illustrate elements that are relevant for a clear understanding of the present invention, while eliminating, for the purpose of clarity, many other elements found in typical avatar-related applications and computing apparatuses, systems and methods. Those of ordinary skill in the art will recognize that other elements and/or steps are desirable and/or required in implementing the present invention. However, because such elements and steps are well known in the art, and because they do not facilitate a better understanding of the present invention, a discussion of such elements and steps is not provided herein. The disclosure herein is directed to all such variations and modifications to such elements and methods known to those skilled in the art. Furthermore, the embodiments identified and illustrated herein are for exemplary purposes only, and are not meant to be exclusive or limited in their description of the present invention.

An avatar is understood by one of ordinary skill in the art to include a computer user's representation of him or herself, such as in the form of a two or three dimensional model used in computer games, social, network applications, or other on-line communities. A typical avatar may further include, or have associated therewith, a user's name, a user's screen name, a handle, or text of interest, such as a trademark, saying, or poem, for example.

A widget, in accordance with the present invention, and as will be understood by one of ordinary skill in the art, is a portable portion of code that may be installed or executed within any separate HTML based webpage by an end user without necessitating additional compilation of that code portion. Such widget code portions, in accordance with the present invention, are embeddable by the end user. As such, a widget in accordance with the present invention is any code portion that may be embedded by the end user within a selected page of HTML, XML, or like code that causes presentation of that selected web page. The widget, via the embedded code portion, thereby adds non-static content to the subject webpage.

Figure 1:
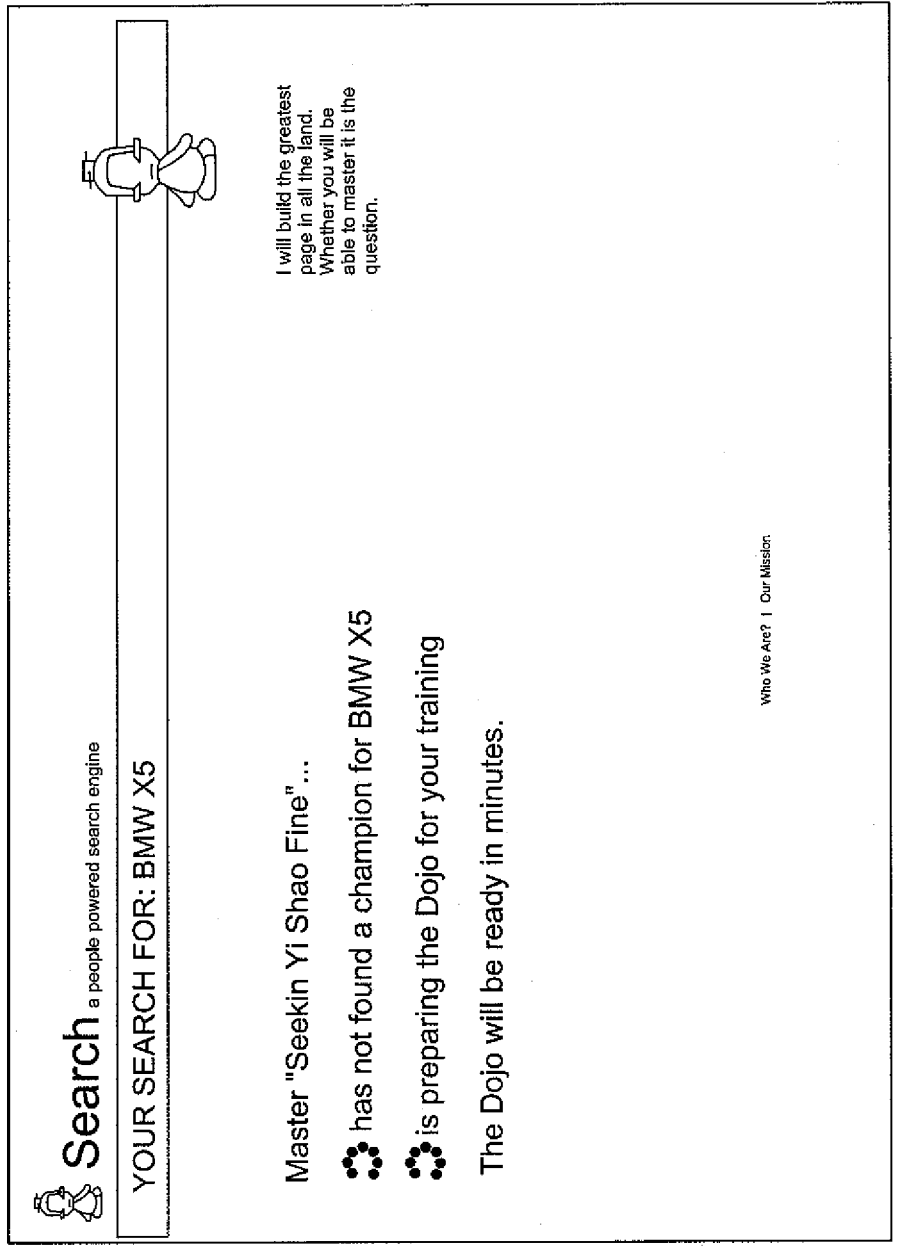
FIG. 1 is an exemplary executable search, according to an aspect of the present invention.

The present invention may allow, with or without the use of widgets and/or widgetized avatars, the execution of specialized searches. For example, as illustrated in FIG. 1, a user may execute a search. The search executed may search for a "master" in the area searched, such as a person having some increased level of expertise in the searched area in a particular environment, such as on one or more of the user's social networks, and/or may seek search results in accordance with those results found most useful by such "masters." The social networks of a user, or a master, may be associated, for example, with an avatar.

Figure 2:
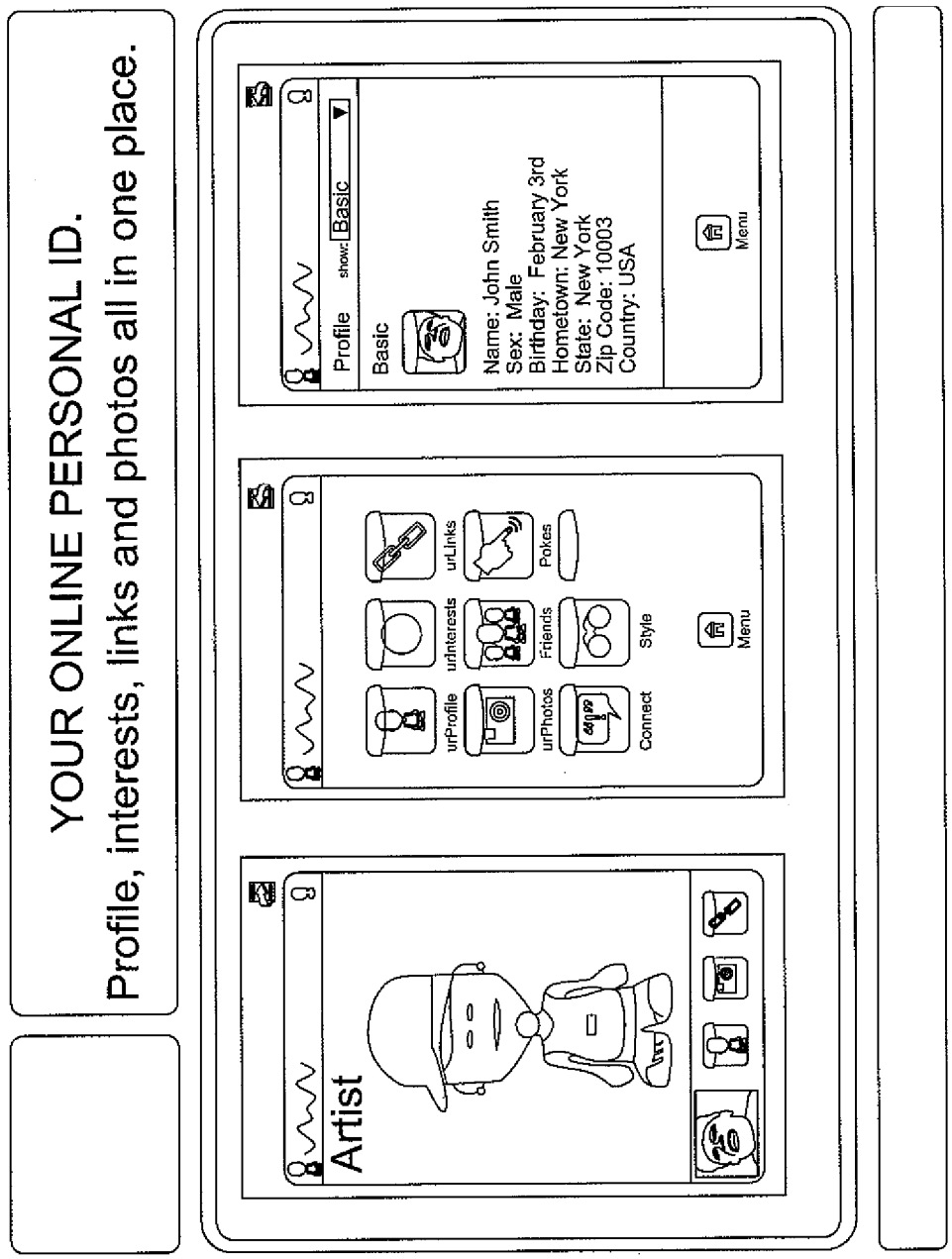
FIG. 2 is an exemplary avatar having customized attributes, according to an aspect of the present invention.

The present invention may thus include a fully portable, widgetized avatar having associated therewith multiple items of information and/or social information that may be generally searched for and/or otherwise requested for association with at least two different computing communities or transactions. Widgetization of the avatar of the present invention necessarily allows for portability of the avatar of the present invention. For example, creation of a typical avatar in accordance with the present invention may include the association of physical, such as facial and hair, features with the subject avatar, as well a user name, as shown in FIG. 2. Further, a myriad of additional information may be associated with the avatar, wherein such information is generally required or desired for use in computing communities or transactions, such as search transactions. This information may be organized into multiple levels of detail, and/or multiple levels of accessibility to third parties in a computing community or transaction. Such levels of accessibility may be selected by the creator of the widgetized avatar, and may be based on characteristics of the third party endeavoring to access the subject avatar. For example, a user may have basic information, which may be selectable for viewing by all registered users.

In an exemplary embodiment, a user may have likes or dislikes, such as musical or motion picture tastes, job or educational status, age, location, income, marital status, and other computed communities with which that user is associated, associated with his or her avatar, and each such like or dislike may have associated therewith, either by the user or the computing community, a level of expertise.

The present invention may provide a physical manifestation of all of this information, such as in a "trading card" format. For example, FIG. 2 illustrates an avatar wherein the front of the virtual trading card includes an avatar having particular physical features, clothing, accessories, activities, likes, dislikes and expertise, and the like, along with an associated user name. However, when an interaction, such as selection of a drop-down menu, selection of a link, a double click, or the like is undertaken to "flip" a trading card to the back, a myriad of additional information is displayed regarding the user related to the widgetized avatar, such as age, interests, likes and dislikes, employment status, and the like.

Needless to say, because the virtual manifestation of a user is embodied in the computing code that provides for the virtual manifestation, such computing code may be accessible via linking to the virtual manifestation, such as to the avatar or a home or base page for the virtual manifestation. As such, the virtual manifestation(s) of others may be returned upon a requested search, and, based on the rated expertise level in the area searched, such virtual manifestations may be ranked responsive to the search. In fact, a resultant "expert" may have multiple pages available for linking to upon searching by another user, wherein each such page may relate to a different topic or area for searching, and therefore wherein each such page may merit a different expertise rating for the user having such pages.

Those skilled in the art will understand that such virtualized manifestations may be provided in a normalized format such that it is easily adopted into multiple computing communities, and/or may be adopted as non-static content onto multiple different web pages. As such, the subject virtual manifestation may be incorporated, responsive to a search, into the search results for multiple social communities, fantasy sports communities, blogs, and the like. Further, virtual manifestations of particular interest to the general public, such as those of musical artists, other famous persons, or "hot" search terms, may have widgets associated with such virtual manifestations downloaded, added to user hot pages, or otherwise referenced by fans of such famous persons. As will be understood by those skilled in the art in light of the discussion herein, and in part due to the fact the certain characteristics of the searching user may be known to the search engine of the present invention, the downloading of widgets in accordance with the present invention allows for a monitoring of who performed a search, what they deemed most relevant responsive to it, and what was done responsive to that relevance, such as the downloading of a widget. Thereby, the present invention may include an advanced marketing and sales tool.

Additionally, such "famous" virtualizations for hot search results may, in fact, be presented in non-classical formats, such as through a tab presentation on a web page designed by the user as a home page in a certain community, or that is set forth by a particular computing community. Such "celebrity" avatars, including in such non-classical formats, may include presentations or allow for interactions with celebrity suggestions or favorites, such as recipes, music, concerts, movies, talk shows, reality shows, or the like, and may further allow for purchases from or related to such suggestions or favorites.

According to another aspect of the present invention, a "wiki," defined herein to include any software that allows users to add or update content on a site using any Web browser, as well as the updated content thus created, which thereby forms a collaborative information location, may be used, both within the operating software platform and as part of any widget application as described herein. In one exemplary embodiment, the wiki may take the form of a wiki page. This format may provide quick collaboration as between users, experts, or any combination thereof. Wiki pages may be identified, have corresponded thereto a path created that determines where the wiki page is located in the wiki, as understood by those skilled in the art.

Wiki pages may also include properties that are usually applied by, and are made visible by, wiki forms. For example, the present invention may make a wiki page editable, such as by an originating author enabling or allowing access to the subject site or page. In some embodiments, access to editing particular wiki pages may be fully open, and in other embodiments, access may be restricted to only certain users viewing the wiki page. Such restriction may be set by the originating author, or may be based on some qualifier, such as subscription level, or it may be based on a ranking, such as an expertise ranking level of an expert or of the user, as described hereinthroughout. As such, the wiki may be limited as to a level of expertise required to contribute to the wiki, or those enabled to review the expertise of other users. The pages in any wiki, whether editable or not by a user, may be fully searchable in accordance with the search capabilities discussed herein.

In another embodiment, users may attach any type of file to a wiki page by utilizing any file attachment mechanism, as understood by those skilled in the art. Attached files may be indexed and available for subsequent searches. In yet another embodiment, any particular attachment may also be a wiki page, and may thus be editable.

In another embodiment, users may create or add comments to a wiki page, or to any widget application as described herein. Comments may be directly linked to an underlying page or application from which the comments are inspired, or they may be entirely separate, such as with a blog format. Comments, in any form, may include such structural properties so as to also make the comments searchable in accordance with the present invention, such as with XPath or SQL, for example.

According to another aspect of the present invention, any wiki or widget as described herein may be structured so as to include at least a limited control of revisions or edits made to the page or application, as referenced hereinabove. For example, a certain user may be enabled to reach back and retrieve any particular previous version, or multiple versions, such as for any level of comparison. This may be presented in the form of a revision history with links to each version, as may be understood by those skilled in the art. In another embodiment, wiki pages may be saved in a page tree view. The page tree view may act as a content hierarchy that includes pages and sub-pages. All or any number of the pages in the tree view may include content, and may thus simultaneously be viewed as containers. The pages in the page tree view may be distinguished by a name or identifier assigned to each page. In further embodiments, the wiki pages may include nodes and leaf nodes that display content and further function as folders or containers for other wiki pages. Any page or version of a page may include edit dates and may be available for selection and/or review.

In another embodiment, the user may use any form to add structure to wiki pages. For example, fields may be defined in any manner, as understood by those skilled in the art, to collect structured data such as dates or numbers, or create pull down menus to consolidate choices, for example. Such forms may be for rating or ranking aspects or attributes of experts, other users, other pages, or any item associated with the searching mechanism or search results as described herein.

In other embodiments, the present invention may collect data from multiple experts or other web sources into a wiki or widget. For example, search results, as described herein, may be collected and consolidated into a web page that may also be within an editable website. Any search results as contemplated herein may be embedded into a wiki or widget. Once embedded, any such data may be automatically updated, or a search "re-run" so as to look up any new information related to the embedded data upon opening of the page or application. For example, developing news, or any sort of real-time data feeds, may be integrated into a page or application as described herein.

According to another aspect of the present invention, users, experts or any application developer may collaborate and develop wiki applications. These applications may include any subject matter and may incorporate any sort of programming as may be understood by those skilled in the art. For example, collaborative applications may include registrations and rosters for experts, such as in association with one or more topics, or any company, entity or other organization. As may be understood by those skilled in the art, processes may be at the server side, the client side, or both, in providing a collaborative environment to develop wiki applications as contemplated herein. As with any other page or application as described herein, these collaborative applications may also be fully searchable or include any sort of searching functionality.

A virtual manifestation, in accordance with the present invention, may thus allow for keyword based searches to be performed in one or more search environments and/or on one or more computing communities, and/or across one or more computing communities, i.e., social networks. For example, as discussed hereinabove, a virtual manifestation, such as an avatar, web page(s), or search result page, in the present invention may have associated therewith a series of unique personal information items indicative of the user associated with the virtual manifestation. Such personal information may include interests, likes, dislikes, which in some may lead to a characterization of expertise in one or more such areas of interest, like, or dislike, which expertise may be associated with the virtual manifestation. Thereby, not only may the user's virtual manifestation travel with the user from computing community to computing community, the user's expertise classifications may likewise travel with the user from computing community to computing community.

Needless to say, typical keyword search engines are understood to those of ordinary skill in the art. Such an engine may be available in a particular computing community, or a search feature may be made available across multiple computing communities, and such a multi-community search engine may, for example, for security purposes, allow a particular user to search only those communities of which that user is a member. Keywords may be entered by a searching user in freehand, or a list of available keywords for expertise searching may be presented to the user for selection of a particular keyword or keywords.

The expertise attribute, and other attributes, may either be entered by the user correspondent to the virtualization to which the expertise rating is assigned, or may be assigned algorithmically, such as by the computing community or across multiple computing communities. For example, as a certain user obtains ever increasing positive feedback, or as a certain user is returned more frequently responsive to a search for expert in a certain area, that user's expertise rating may increase. Alternatively, a user may submit external information to a computing community to prove that user's level of expertise, and the computing community may respond in kind by assigning a particular level of expertise to that user.

In the prior art, subsequent users may, in certain embodiments, access and/or make use of prior searches by prior users of a search engine. However, even in such instances, the subsequent user has no way of knowing of the expertise level of the prior searching user, that is, the subsequent user has no way of knowing if the prior user was an expert, or at least had sufficient expertise to make reusing his or her search worthwhile. More particularly, the logic of the prior art is flawed, at least in that a true expert in a particular area is unlikely to employ base level searches in a typical search engine. Rather, a true expert in a particular area is likely to have record of, such as by bookmarking, live-linking, or having a page dedicated to, particular links or points of interest that that expert has found helpful. Thus, it is far more useful for the subsequent user to search for an expert or an expert's results, and then make use of the expert's recommended information or search points, than it is for the user who is a non-expert to formulate his or her own search, or reuse a prior search that may or may not have been performed by an expert. Thereby, the present invention allows for the conversion of a traditional search into a dynamic search far more likely to produce useful information to a user, at least based on the fact that the search will lead to the location of a known expert in the field searched.

Additionally and alternatively, experts in particular fields may advertise their expertise, such as wherein his or her expertise has been verified by the computing community, and a searching user may search such "advertisements" in order to locate a known expert in a particular field. Thus, a search in the present invention may produce the virtualization and social information of an expert, may produce an advertisement from an expert, may produce search result information known to be used by experts or particular experts, or the like.

Further, it will be apparent to those skilled in the art in light of the disclosure herein that unique expert rating systems may be employed, and/or that experts meeting certain criteria may be assigned unique, interesting, amusing, or the like ratings. For example, a particular computing community may assign an introductory level expert a "white belt" if that user is an expert in a particular area, and may assign a different rating if that user is an expert in another area, or may assign the white belt rating to all introductory experts in all areas. Of course, in such an exemplary embodiment, successively greater experts would be assigned successively higher ratings such as green belt, brown belt, and black belt for the highest rated experts in the above white belt example. Likewise, rating systems may be or include unique nomenclature for different possible areas of expertise. For example, automotive experts may be assigned ratings such as weekend warrior mechanic, mechanic, master mechanic, or Mister Goodwrench® for the highest level expertise with regard to automobiles. Needless to say, expertise in certain particular areas, such as automobiles, may be further hierarchically broken down, such as by type of automobile, year of automobile, manufacturer of automobile, or the like.

The present invention may offer an experts arena, wherein different experts arenas may be available for different areas of expertise. Within an expert arena, the searching user may find topical discussions, such as blogs, between certain experts, or may find lists of experts, or may find lists of experts broken down by level of expertise. Further, such an arena may include indexed information based on the use of that information by experts, and/or based on the ratings of the experts that use such information.

Thus, the present invention, at least in part, may provide searching based on the relevancy of a person's expertise to a desired topic on which help is sought, rather than the prior art methodology of keyword searching relating not to people and/or experts, but instead relating merely to websites, things, or advertised services that have no expertise rating associated therewith. Of course, this embodiment of the present invention allows the keyword revenue model of prior art search engines, such as Google®, to be employed in the monetization of searching for true experts that can assist in topical areas, and/or expert information in those topical areas, associated with the particular keywords searched.

As such, the present invention provides a recommendation engine. The recommendation engine may integrate a particular virtualized identity, along with a webtop, desktop, search results application, social network, and/or other type of computing community, to allow for suggestion of content, information, or physical experts based on a user's expertise as assessed from that user's community, that user's other communities, that user's popularity, that user's feedback, that user's click stream, that user's interest, that user's prior accessed information, or that user's searches or search results. Such information may allow for an expertise rating that may be assigned by the computing community, or that may be used by users to identify themselves as experts in certain areas, which may further allow such users to populate an advertisement, results page, web page, web forum, applet, widget, or the like that will readily allow searching users to search and find that expert and/or that expert's recommended results.

Thus, in accordance with the exemplary embodiments set forth hereinthroughout, the present invention provides an intersection between keywords and expertise in those keywords. As will be apparent to those skilled in the art in light of this discussion, similarities among users increases relevancy for keyword search results, particularly in localized, such as geographic or topical localization, searching, and the advantages gained from this similarity are further heightened when one of the users wishes to gain from the expertise of a similar user in a desired area. Such expertise-based keyword searching is particularly useful in areas in which such unique expertise would generally improve search results, such as in, but not limited to, geographic locality, travel, health, entertainment, cars, lifestyle, education and commerce, for example.

In an exemplary flow of the present invention, and returning now to FIG. 1, a user-entered search causes the execution of a search, and the user may be presented with a unique page while search results, which preferably include expertise-based information and/or experts in the area searched, are dynamically built. The dynamically generated results page may be presented in any number of formats, such as in a searchable blog format.

Figure 3A:
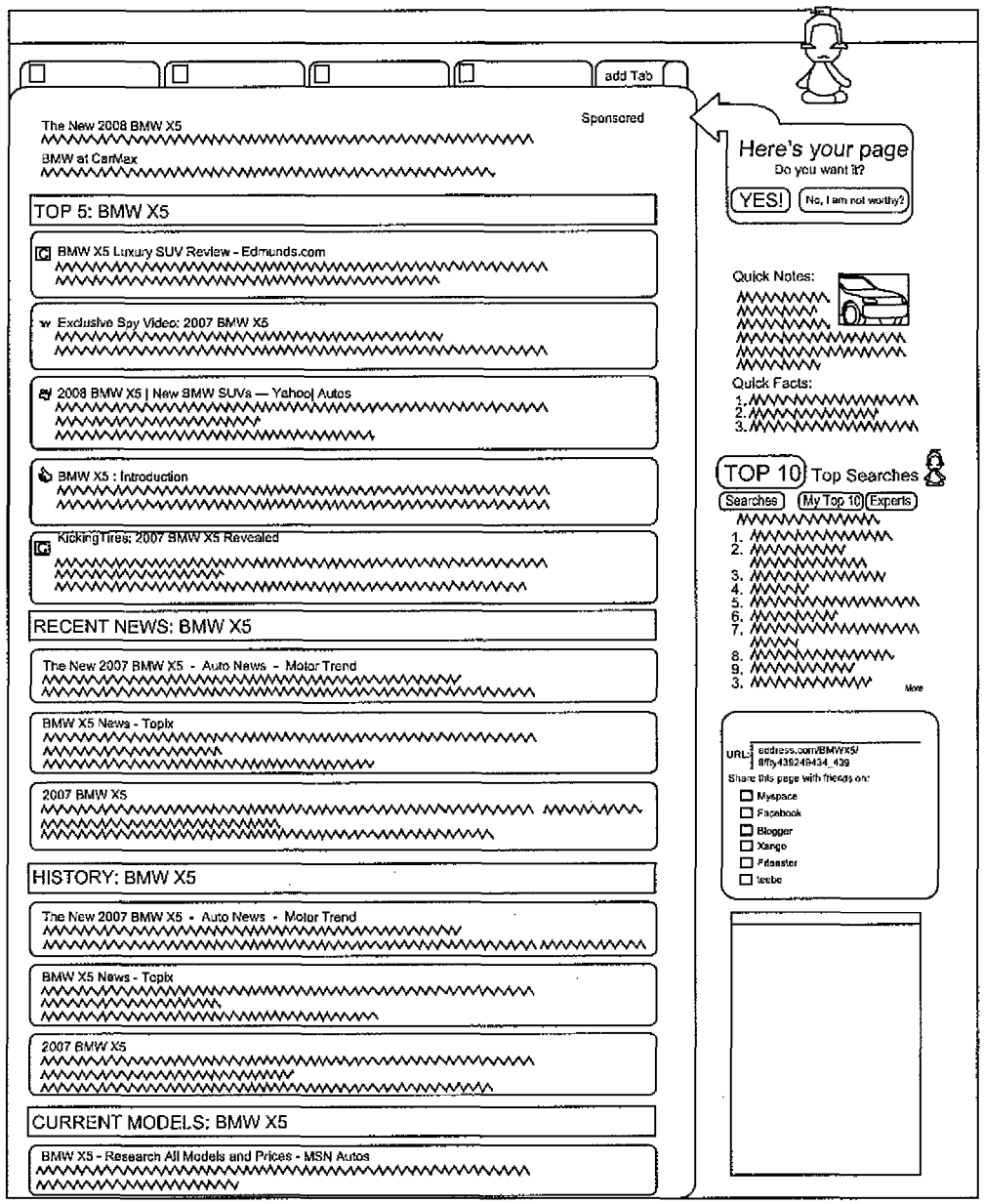
FIG. 3A is an exemplary search result, according to an aspect of the present invention.
Figure 3B:
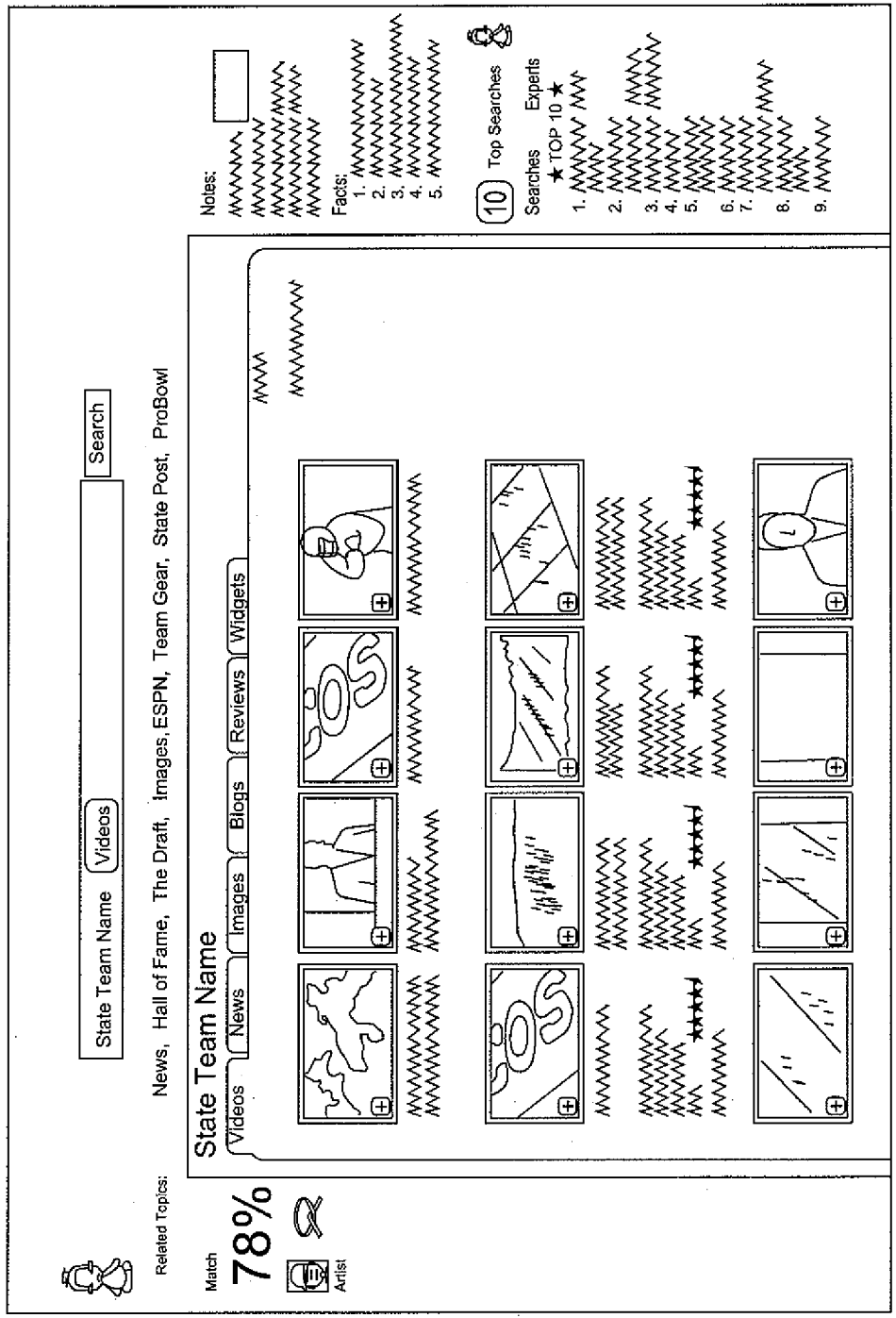
FIG. 3B is an exemplary presentation of a search result, according to an aspect of the present invention.
Figure 4:
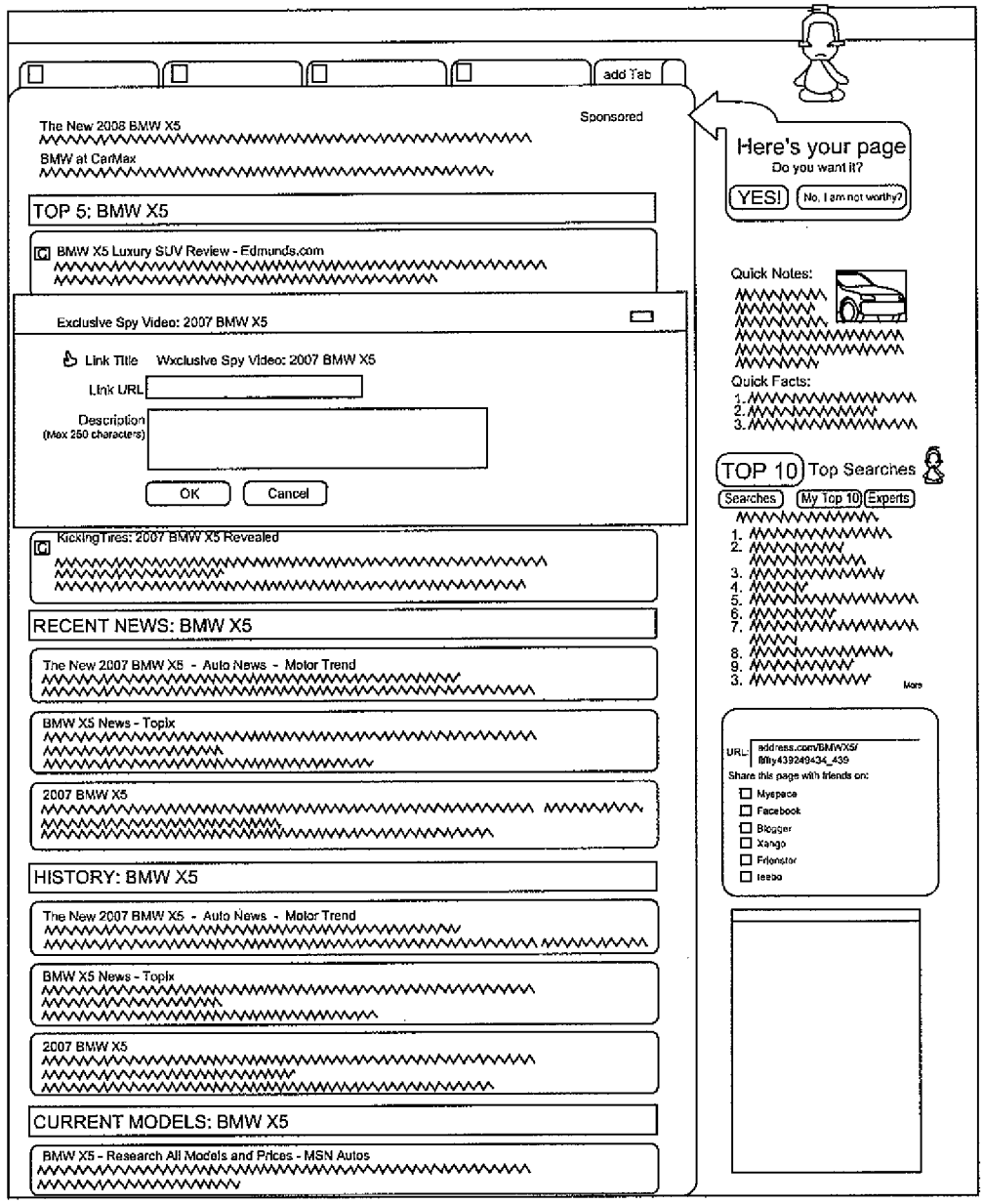
FIG. 4 is an exemplary search result that provides addition to keyword-related favorites, tagging, and adding expert's quick note comments, according to an aspect of the present invention.

For example, search results may be presented as illustrated in FIG. 3A. The search result presentation illustrated does not include presentation of particular experts in the area searched, but does include an accessible linking, such as via the illustrated tab or a drop down menu, for example, to experts in the search area, (which, in this exemplary embodiment, was an automobile, and more particularly a "BMW X5"), and does include links, organized conveniently by category (i.e. "Top 5," "Recent News," "History," and Current Models," for example). The links presented may preferably be those found most useful by users having greater expertise in the area searched than the searching user to whom this results page is presented. Further, categorical arrangement of the results allows for a user to "refine" the search by particular areas that may have been of most interest to the user, but that may not have been included in the search keywords. Further, the results page may include brief information assessed by experts on the search keywords, may include the day's top searches generally, and may include a sharing tool through which the searching user can share search results, experts, or expertise in one or more computing communities, such as those computing communities of which the searching user is a member. Additionally and alternatively, FIG. 3B illustrates methods of presenting search results, such as by providing tabs wherein the searching user may click different tabs to view different types of search results. Additionally and alternatively, a user may be able to take links returned and add to keyword-related favorites, tag for future use, and/or add expert's quick note comments for future users, as illustrated in FIG. 4.

Figure 5:
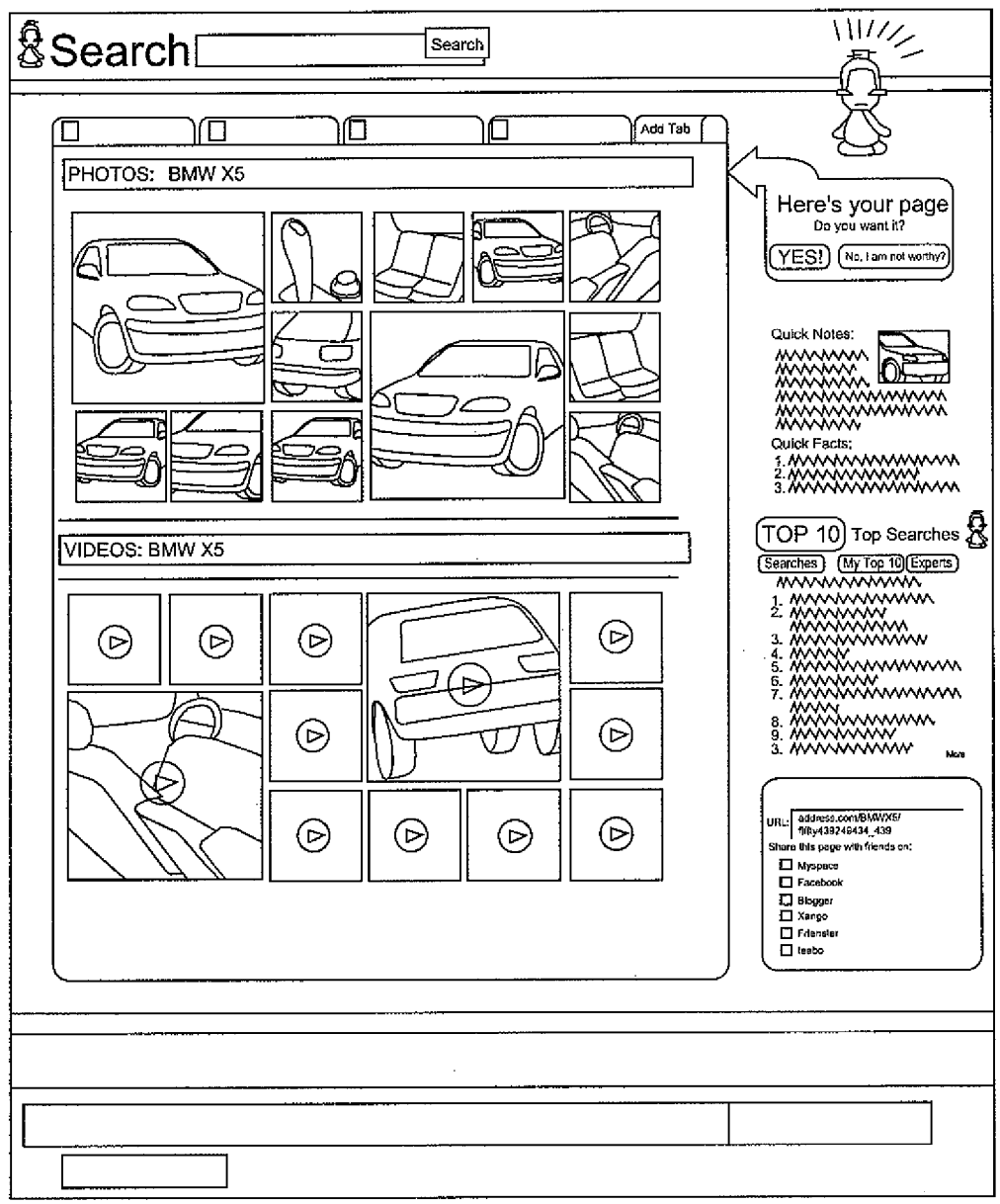
FIG. 5 is an exemplary search result including snapshots, thumbnails, and mouse-overs without actually entering the presented link, according to an aspect of the present invention.
Figure 6:
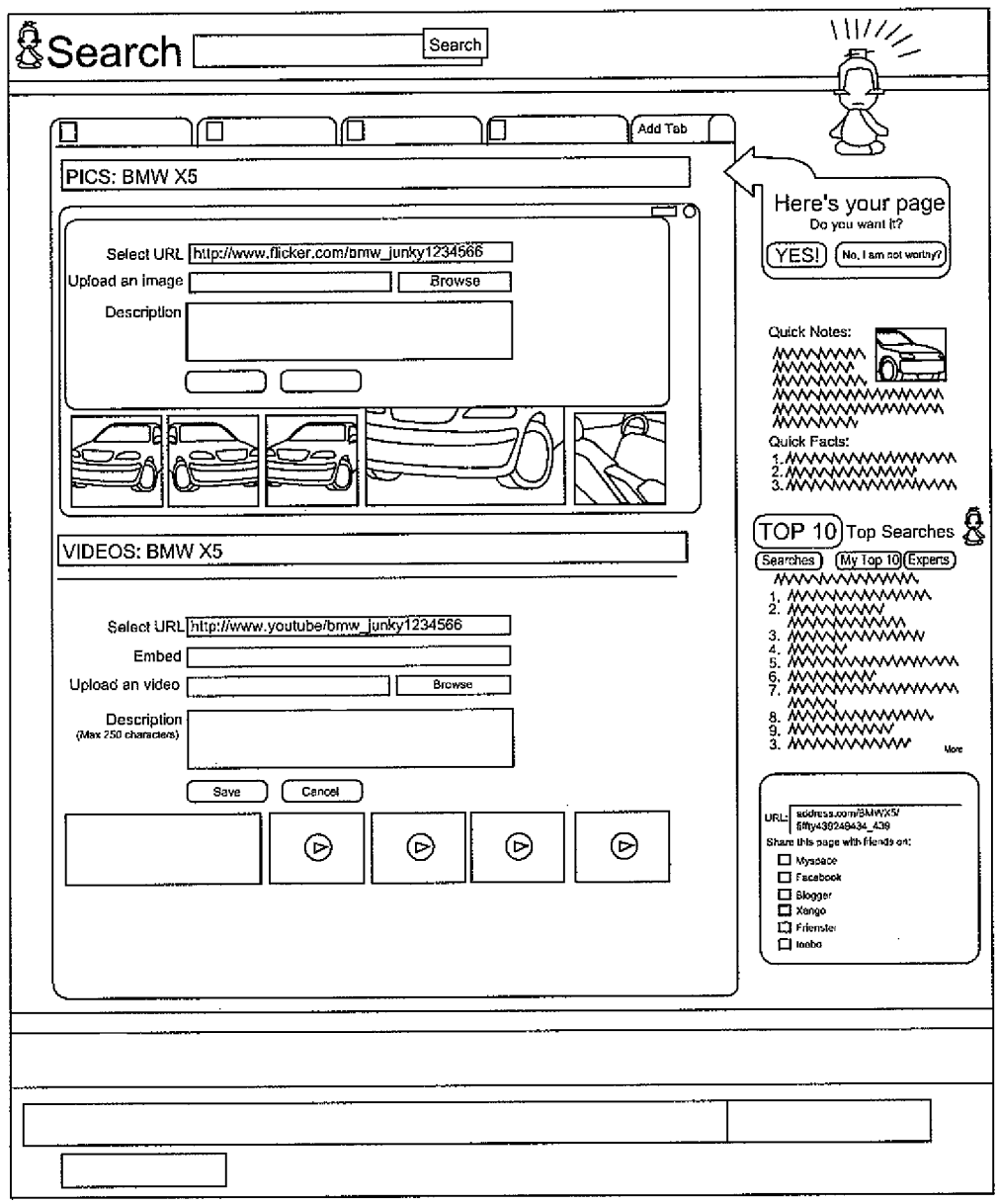
FIG. 6 is an exemplary search result as in FIG. 5, that a user may edit, upload, tag, or change, according to an aspect of the present invention.

Other categories, such as photos, videos, blogs and the like related to the search keywords may also be categorically presented, for ease of locating by the searching user, and in fact may include presentation of snapshots, thumbnails, mouse-overs or the like to allow a user to assess relevance or desirability from the results page, and without actually entering the presented link. The feeds presented may be, for example, RSS feeds, YouTube feeds, or the like, as illustrated in FIG. 5. Further, as was the case with the links presented hereinabove, the searching user may edit, upload, tag, change, or recommend any picture or video box, as illustrated in FIG. 6.

Figure 7:
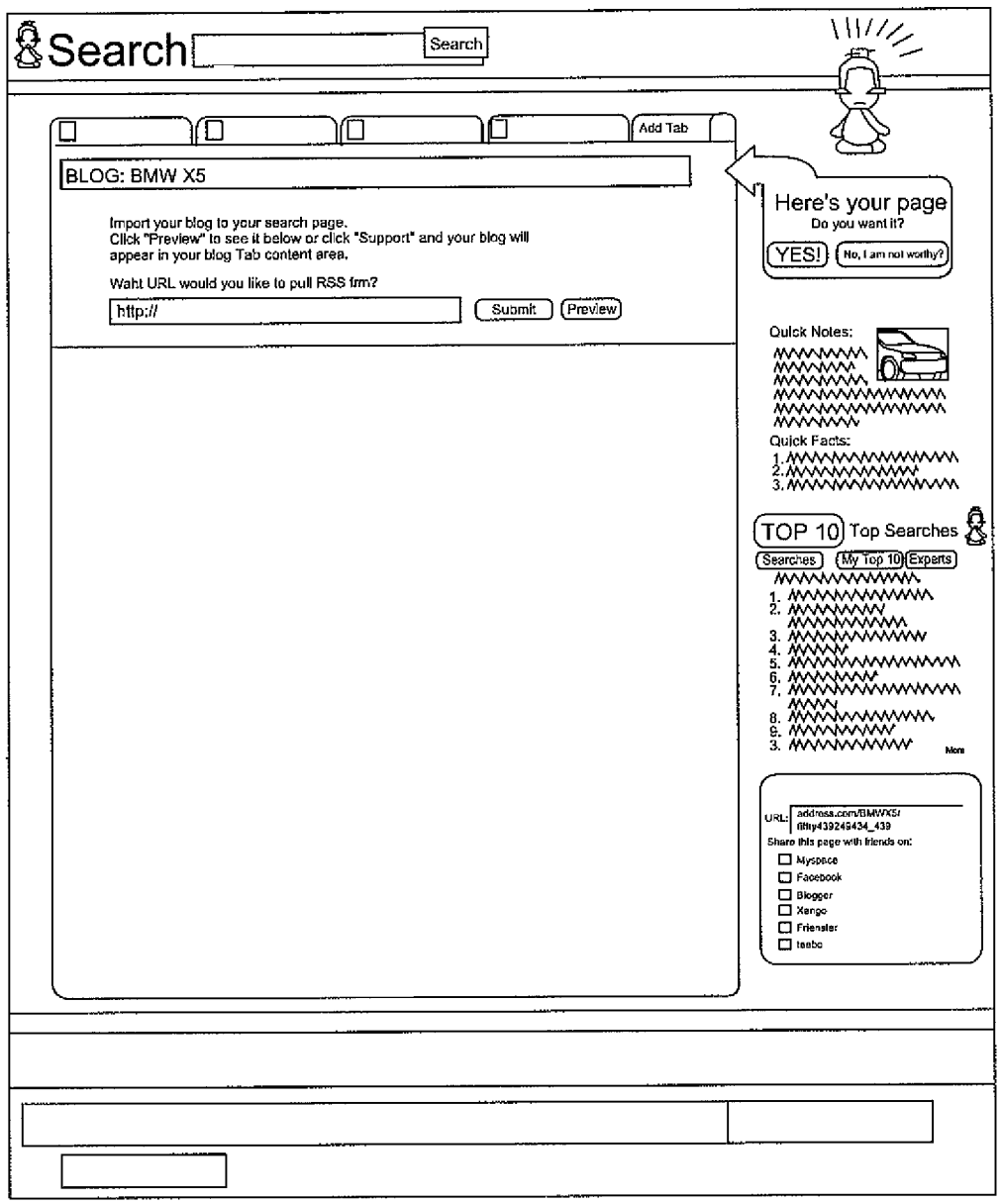
FIG. 7 is an exemplary format allowing a searching user to post a blog by entering a URL, according to an aspect of the present invention.
Figure 8:
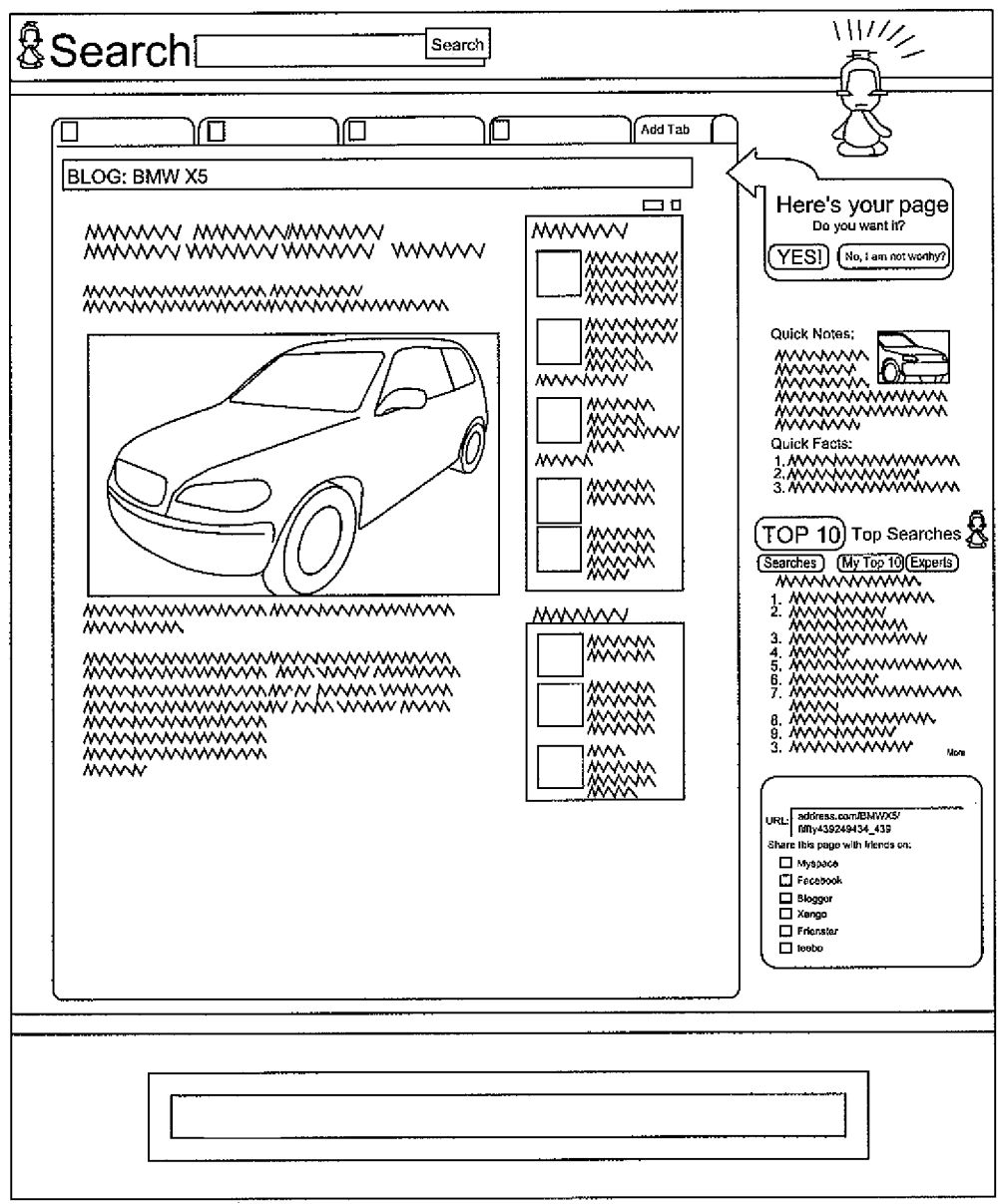
FIG. 8 is an exemplary format as in FIG. 7, where the blog may be posted to the user's search results tab, according to an aspect of the present invention.
Figure 9:
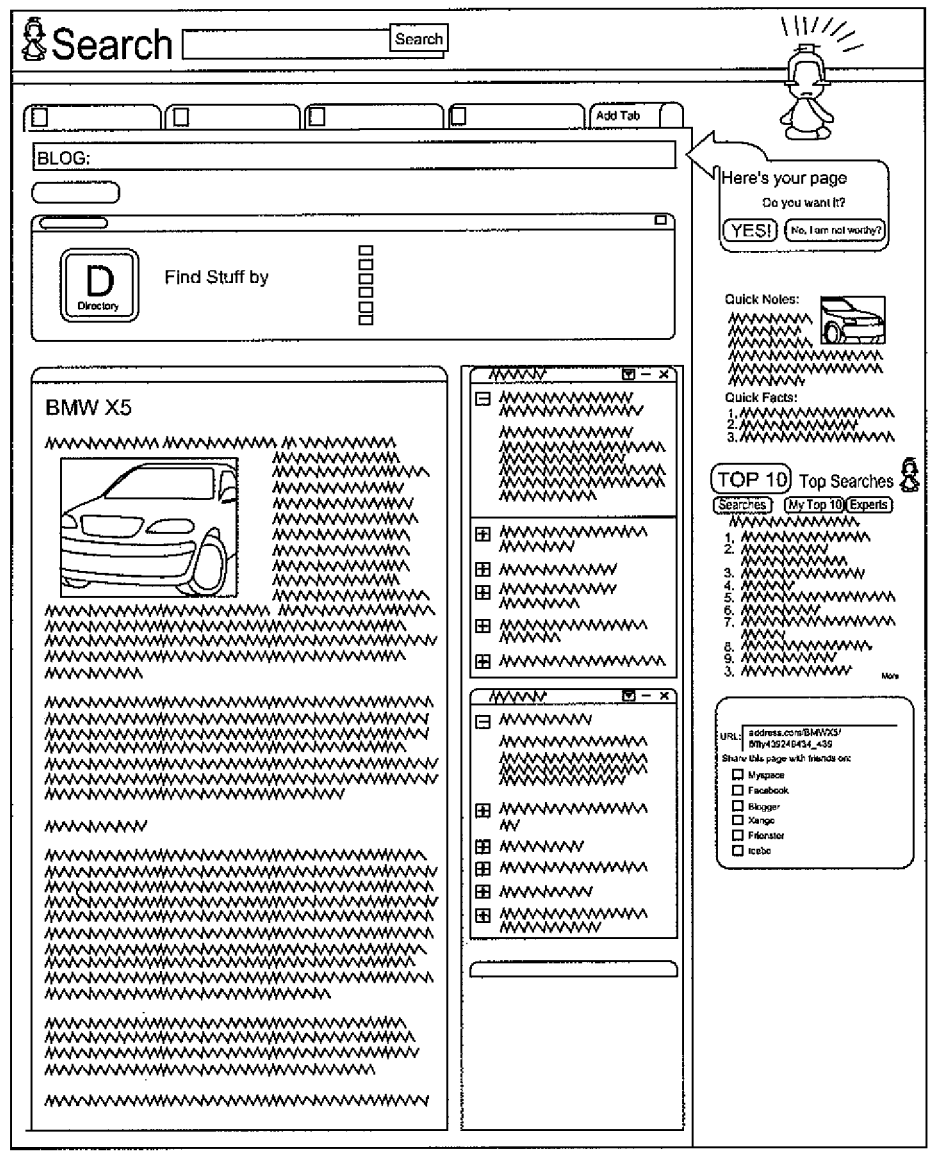
FIG. 9 is an exemplary created and published widget based on the formats of FIGS. 7 and 8, according to an aspect of the present invention.

In fact, in a manner similar to the photo and videos discussed hereinabove, the searching user can additionally post his or her blog simply by entering the URL, as shown in FIG. 7. Thereby, the searching user's blog may be posted to the user's search results tab, as illustrated in FIG. 8. For example, the user's blog, or one or more blogs of interest to the user, and additionally or alternatively pictures, videos, music, and/or interests of the user of interest to the user, may be employed to create a widget, which user created widget may likewise be published to the user's search results, as illustrated in FIG. 9. Similarly, widgets returned responsive to a search may be downloaded by a user, such as to the user's desktop, or other user's page of interest, such as a MySpace page or the like.

Figure 10:
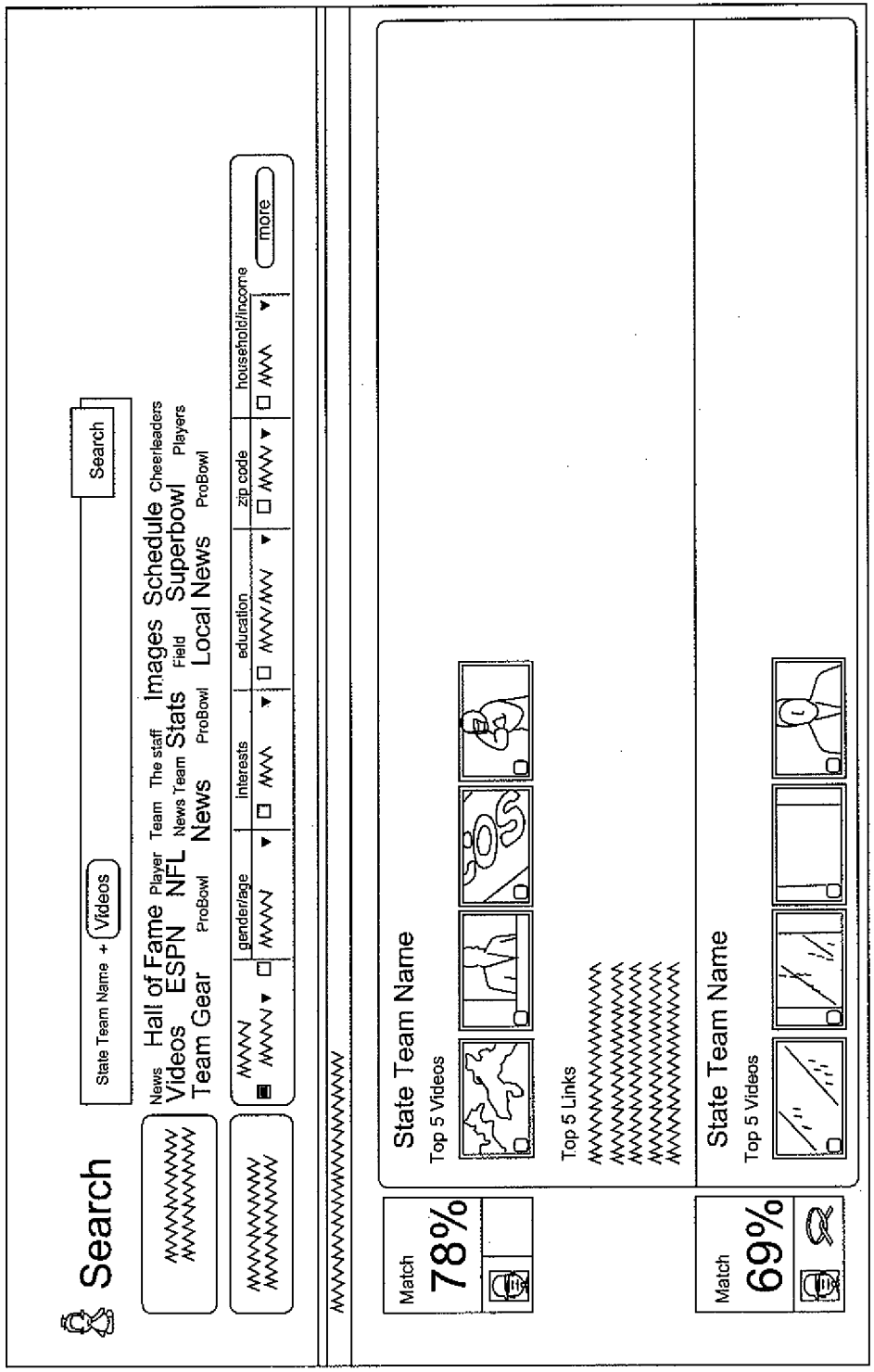
FIG. 10 is an exemplary search results page, based on assumptions, according to an aspect of the present invention.
Figure 11:
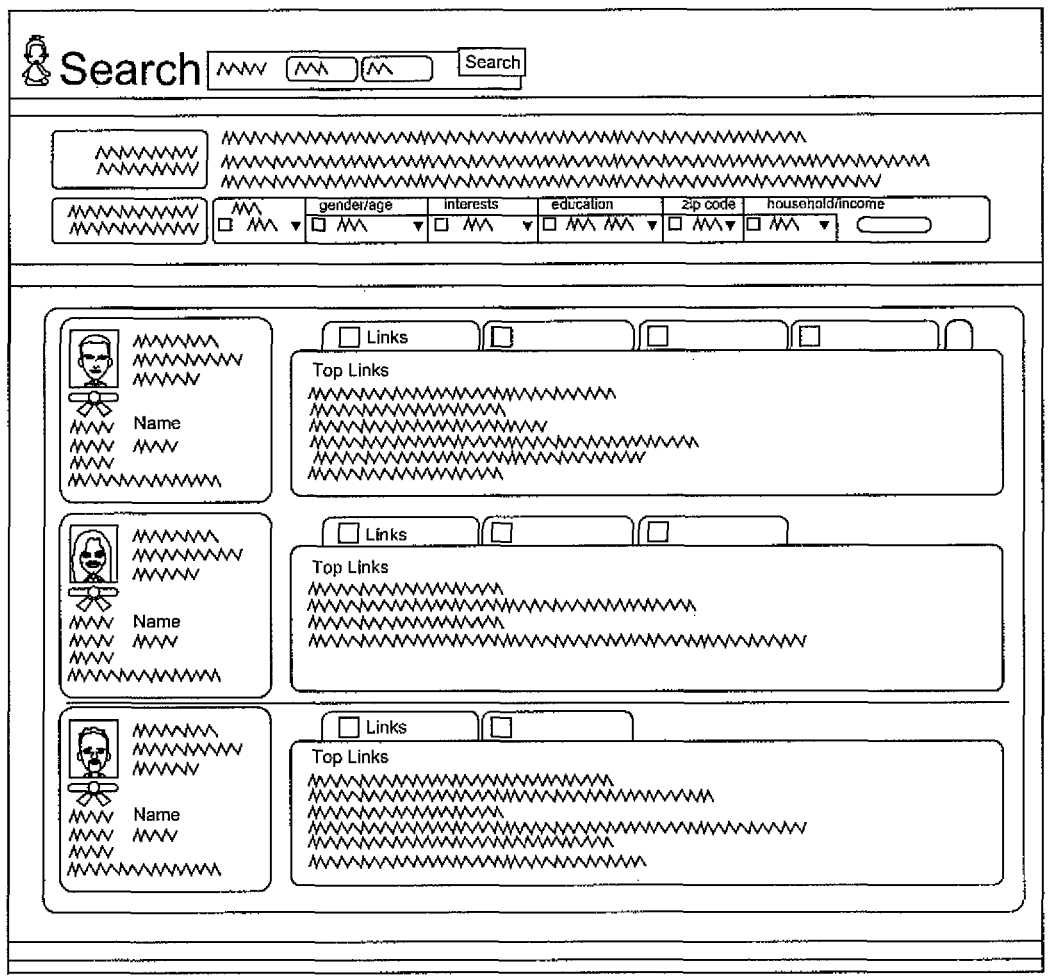
FIG. 11 is an exemplary search results page, where each keyword, and each additional keyword, can modify the expert matches for the search, according to an aspect of the present invention.

An additional exemplary results page is presented in FIG. 10. FIG. 10 illustrates search results for keywords "Denver Broncos" and "Videos." Of note, this search has returned principally videos, operating under the assumption that the user has searched videos because the user wishes to see videos, not be presented, for example, with textual information related to videos. This assumption may be made, in accordance with the present invention, based on an understanding of what such a combinations of keywords would mean to an expert specifically in the area of the search keywords. Of further note in FIG. 10 is the "tag cloud" presented at the top of the search results. The tag cloud in the present invention may, for example, be generated in accordance with information, such as custom tabs, associated with experts in the fields of the keywords searched by the searching user. As such, unlike prior art search mechanisms, selection of additional keywords from the tag cloud for inclusion in the subject search actual increases the relevance of search results, in a manner similar to a linguistic search. Further, each keyword, and each additional keyword, may modify the expert matches for the search, as displayed along the left column of the search results in the illustrated examples of FIGS. 10 and 11, in real time. Such expert matches may, of course, include matching factors, such as percentage match of the expert to the search terms, search terms plus any filters, etc., expert rating, expert views, and freshness of the match, for example.

Figure 12:
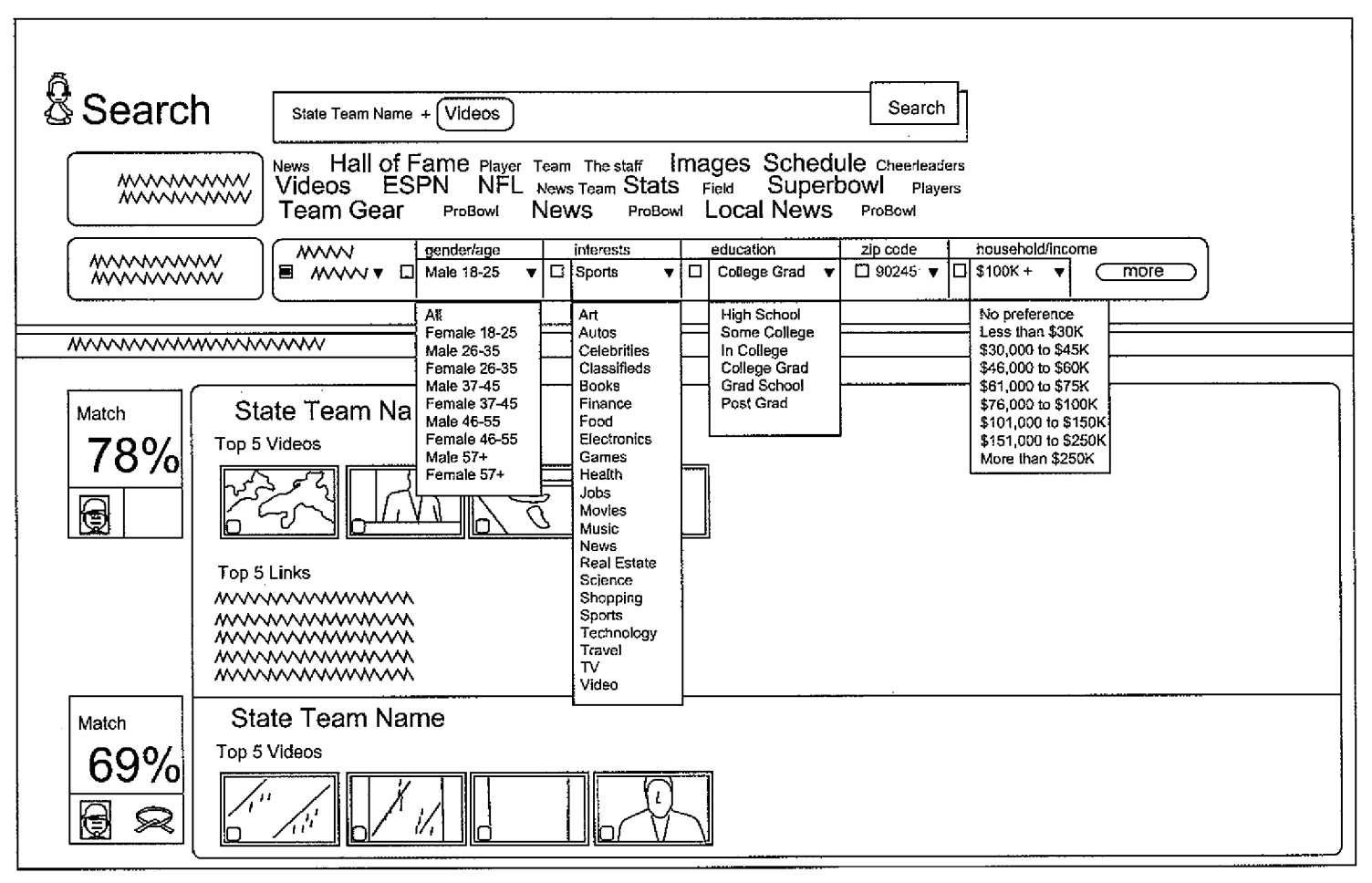
Figure 13:
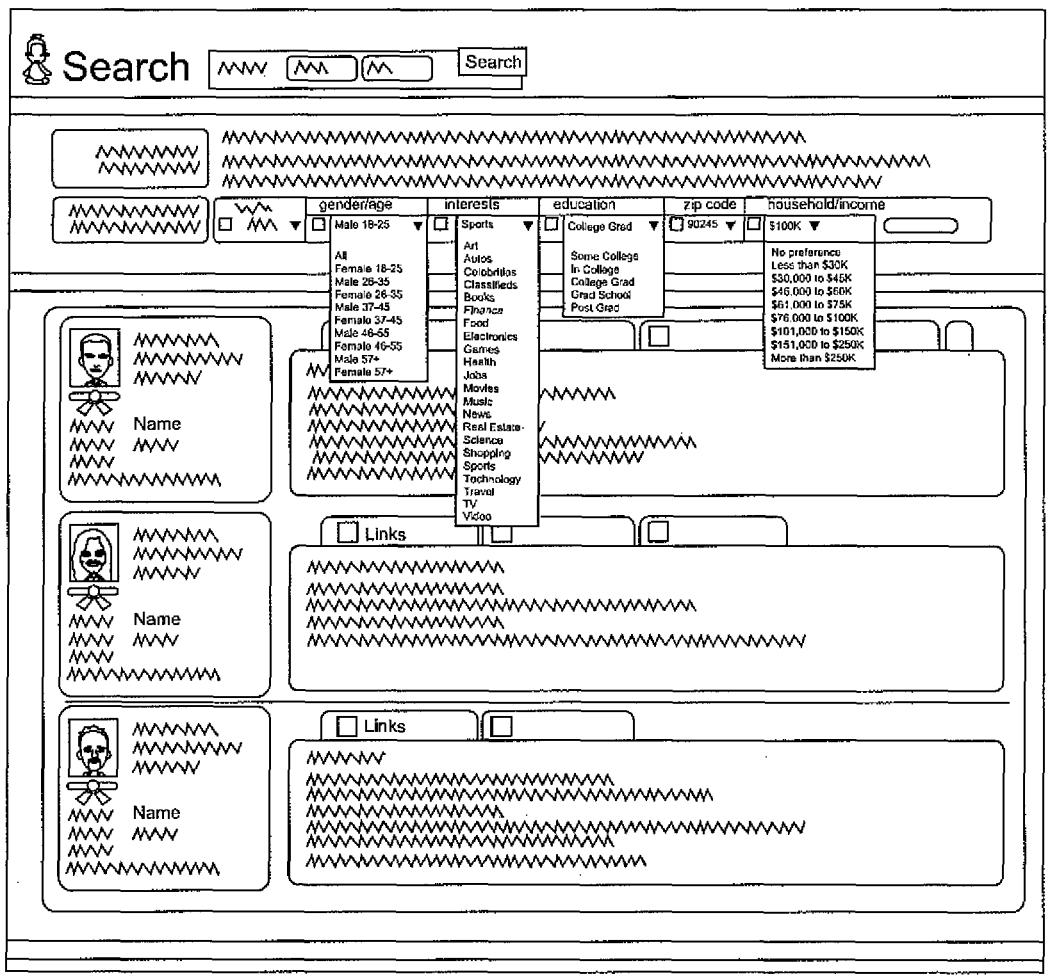
FIG. 13 is another exemplary search result providing filtering options, according to an aspect of the present invention.
Figure 14:
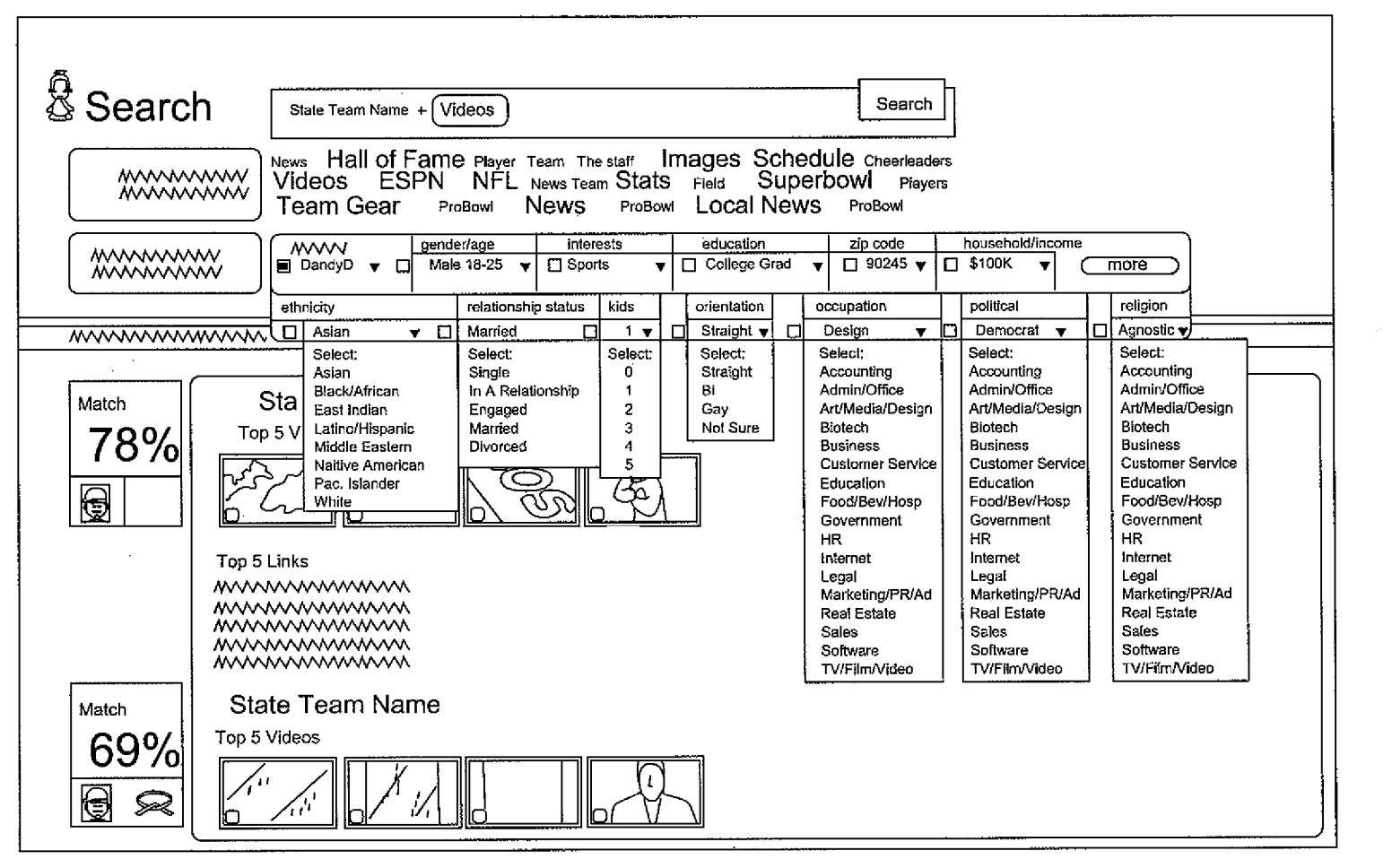

Additionally, FIG. 10 illustrates, under the tag cloud in this exemplary embodiment, the filtering made available in the search of the present invention. Filters may, for example, provide additional touch points about the searching user that are relevant to the searching user and his or her search that help the search produce experts that match the user's demographics. For example, filtering a search by the gender, age, education and income of the searching user in the present invention, which are several of the exemplary options illustrated in FIGS. 12, 13 and 14 increases the relevance of the experts used by the present invention to produce the search results. Thereby, the present invention provides additional layers to produce increasingly relevant search results. Further, as illustrated in FIG. 14, certain of the available filters may be hidden in order to improve presentation for the user, and such filters may be selectable by the user to be presented in addition to first layer filters, such as by clicking a "More" tab or button. Different layers of filtering may be hierarchically interdependent, or may not be, as will be understood by those skilled in the art. For example, a "Religious affiliation" Tab may drop down to present "Christian" as one of the option, and a second layer of interdependent filtering may present different options of Christian religions in the event the "Christian" tab is selected, such as "Lutheran," Methodist," etc. In light of the discussion hereinabove, the present invention does not produce search results using any type of web-crawling algorithm, but rather produces search results by matching people, interests, demographics, and the like.

Figure 15:
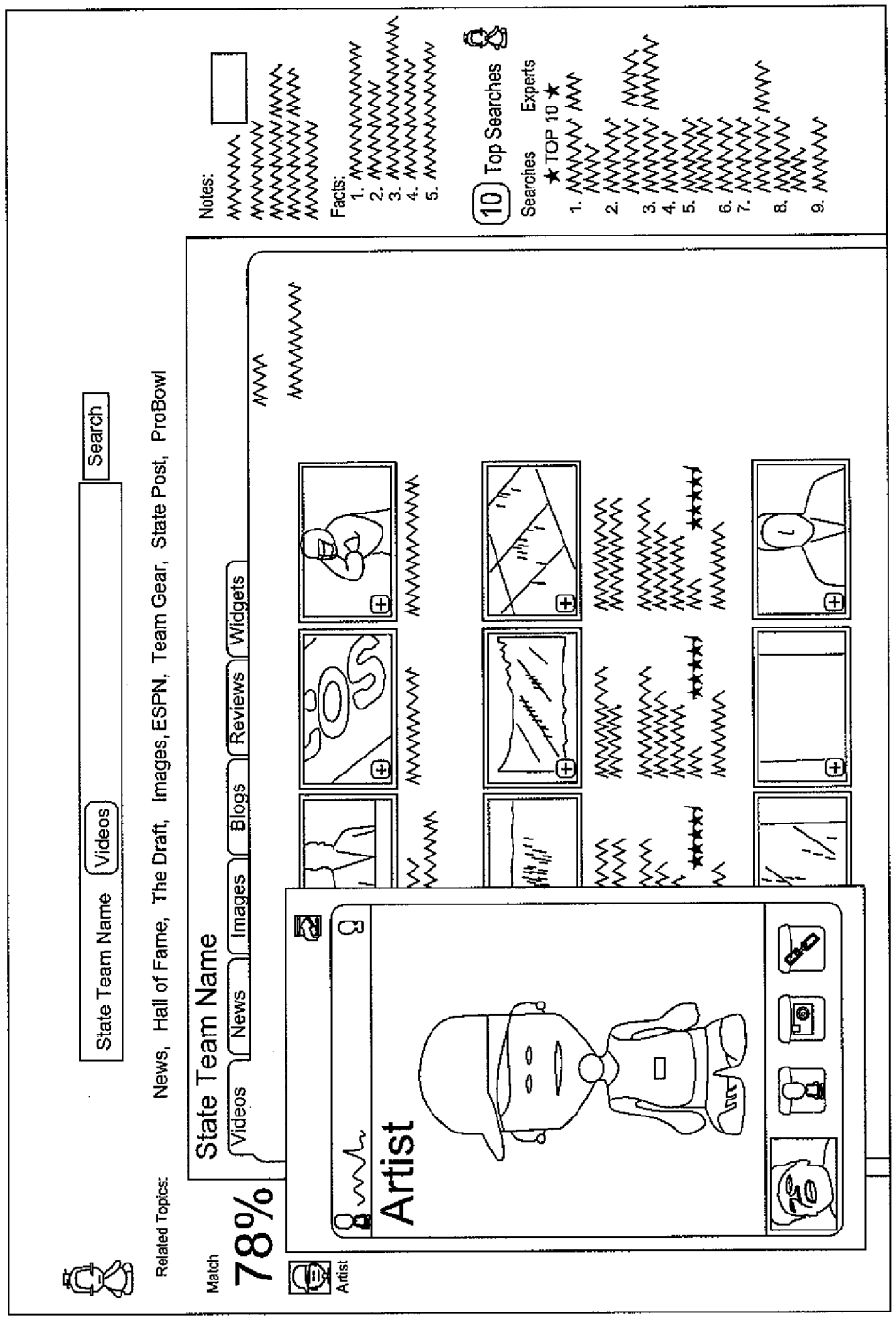
FIG. 15 is an exemplary selection, by a searching user, of one of the experts produced responsive to a search, according to an aspect of the present invention.
Figure 16:
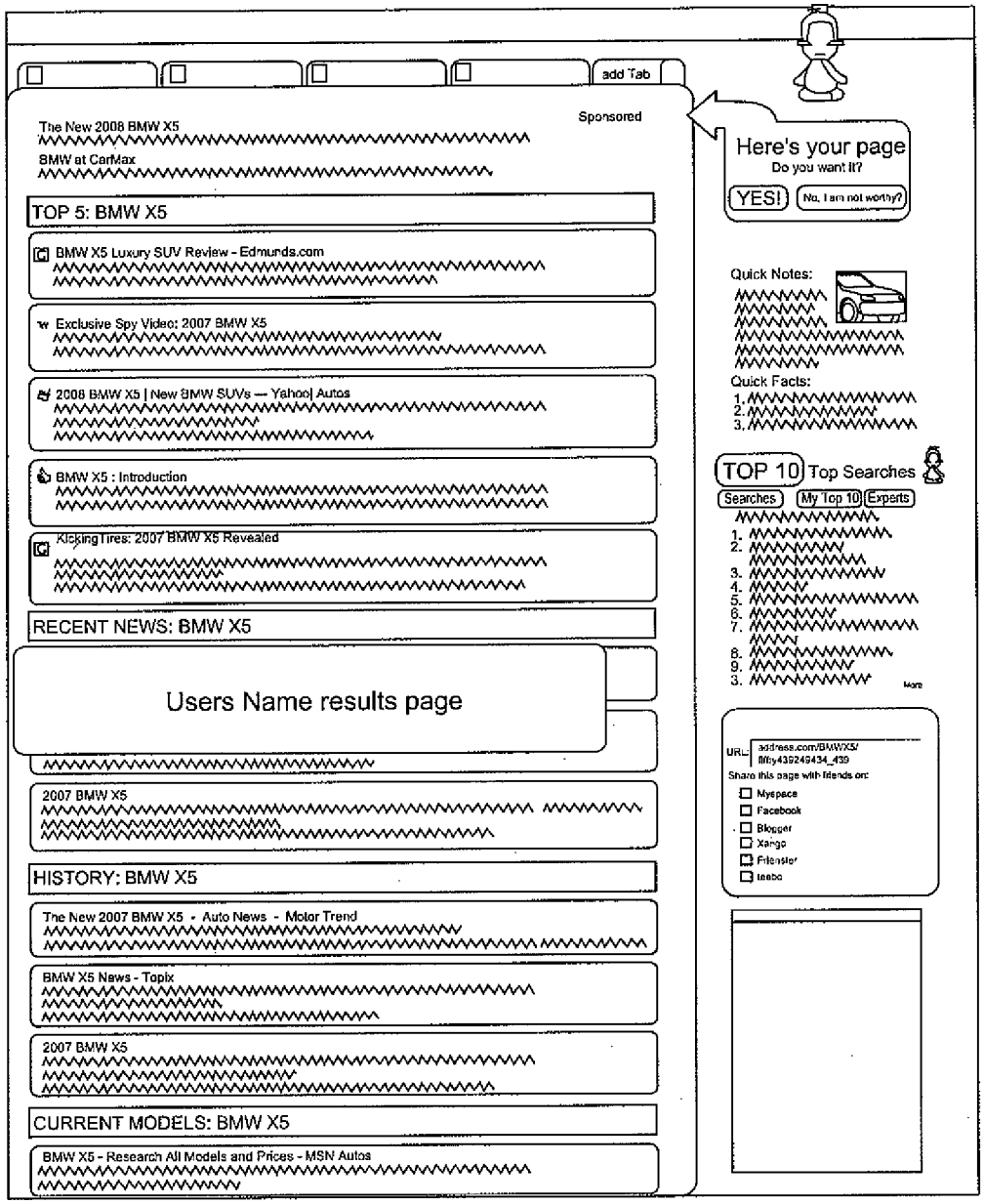
FIG. 16 is an exemplary page illustrating an expert's topical page related to search keywords entered by a user upon selection of that expert's page responsive to a first search, according to an aspect of the present invention.

FIG. 15 illustrates the selection, by the searching user, of one of the experts produced responsive to the search. FIG. 16 illustrates that, upon selection of an expert page responsive to a search, that expert's topical page related to the search keywords is produced. In the illustrated embodiment, Bobby Beemer is an expert in BMW automobiles and, based on his assigned percentage, is the best matched expert by topic and demographics and filters to the searching user. Also maintained on the expert's result page, as illustrated in FIG. 16, are the other available expert matches for the user's search. Thus, with a single click, if the searching user deems Bobby Beemer's page in the exemplary embodiment to be unhelpful, the user can explore the expert's pages of other matching experts to the initial search. Preferably, the searching user can thus explore the results from multiple experts on the topic search without returning to the user's main search page to explore the results of each different expert.

Needless to say, the search capabilities of the present invention may be employed in conjunction with more typical prior art search capabilities, such as a web crawler, to increase the richness of the search results produced. In such an exemplary embodiment, the results of the present invention and a prior art type search may be presented to the user seamlessly and simultaneously, or may be produced separately to allow the user to assess which methodology has produced the most relevant results. Those skilled in the art will understand that, in the event a searching user is allowed to select between the results of multiple different search types, the type ultimately selected should be indicative of which search method produced the more relevant results. Thereby, tracking which result set is selected by the searching user may be algorithmically employed by the present invention in order to further improve the search results produced by the present invention.

Those of ordinary skill in the art will recognize that many modifications and variations of the present invention may be implemented without departing from the spirit or scope of the invention. Thus, it is intended that the present invention cover the modification and variations of this invention provided they come within the scope of the appended claims and their equivalents.

What is claimed is:

1. A computer-based method of performing a social based search, comprising the steps:
providing a computer;
wherein said computer is comprised of a display and a social based search program;
receiving, from a user, by said social based search program, at least one search keyword;
comparing, by said social based search program, said at least one search keyword to a plurality of keywords; wherein said plurality of keywords are associated with one or more experts;
producing by said social based search program a first search result;
wherein said first search result includes at least one of said one or more experts and a plurality of information associated with the at least one of said one or more experts, wherein said at least one expert of said one or more experts and said plurality of information are substantially related to said at least one search keyword;
wherein said expert is ranked with an expertise ranking, wherein said expertise ranking is based at least partially on a plurality of positive feedback from a computing community;
applying at least one filter to said first search result, wherein said at least one filter provides a broadening of said at least one search keyword.

2. The method of claim 1, wherein said expert is presented to said user as an avatar.

3. The method of claim 2, wherein said avatar is accessible to said user via a widget.

4. The method of claim 2, wherein said avatar is located at a wiki page.

5. The method of claim 3, wherein said avatar is presented as a virtual trading card.

6. The method of claim 5, wherein said virtual trading card is multi-sided.

7. The method of claim 6, wherein said virtual trading card is viewed on said display via at least one selection of the group selections consisting of: selection of a drop-down menu, selection of a link, and a double click.

8. The method of claim 7, wherein said plurality of positive feedback from said computing community is a searchable wiki and is attributable to said expertise ranking.

9. The method of claim 1, further comprising one or more expert filters; wherein said one or more expert filters are provided by said expert.

10. The method of claim 1, wherein said first search result is at least partially restricted to a social community.

11. The method of claim 1, wherein said plurality of information associated with the expert includes an advertisement for said expert.

12. The method of claim 1, wherein said plurality of information associated with said expert includes a blog.

13. The method of claim 1, wherein said plurality of information associated with said expert comprises a wiki page.

* * * * *